US012475759B2

(12) United States Patent
Phillips, Jr. et al.

(10) Patent No.: US 12,475,759 B2
(45) Date of Patent: Nov. 18, 2025

(54) AUXILIARY BEZEL ASSEMBLY AND BEZEL ATTACHMENT METHOD FOR VIDEO DISPLAY DEVICES

(71) Applicant: Everi Games Inc., Austin, TX (US)

(72) Inventors: Peter A. Phillips, Jr., Austin, TX (US); Daniel Gibson, Austin, TX (US); Travis Bussey, Austin, TX (US)

(73) Assignee: Everi Games, Inc., Austin, TX (US)

( * ) Notice: Subject to any disclaimer, the term of this patent is extended or adjusted under 35 U.S.C. 154(b) by 592 days.

(21) Appl. No.: 17/962,480

(22) Filed: Oct. 8, 2022

(65) Prior Publication Data

US 2024/0119784 A1 Apr. 11, 2024

(51) Int. Cl.
*G07F 17/32* (2006.01)

(52) U.S. Cl.
CPC .......... *G07F 17/3216* (2013.01)

(58) Field of Classification Search
CPC .......... G07F 17/3216; G07F 17/3202; G07F 17/3211
See application file for complete search history.

(56) References Cited

U.S. PATENT DOCUMENTS

2012/0122571 A1* 5/2012 DeSimone .......... G07F 17/3211 463/31
2014/0351045 A1* 11/2014 Abihssira .......... H04N 21/812 705/14.53
2020/0310487 A1* 10/2020 Artwohl .......... A47F 3/043

* cited by examiner

*Primary Examiner* — Jasson H Yoo
(74) *Attorney, Agent, or Firm* — Calvert Technology Law, PLLC; Nathan H. Calvert

(57) ABSTRACT

An auxiliary bezel assembly includes first-side and second-side attachment structures, an auxiliary bezel, and a first-side and second-side attachment feature. The auxiliary bezel defines an auxiliary bezel display area and is connected to the first-side attachment structure at a first side of the auxiliary bezel display area and to the second-side attachment structure at a second side of the auxiliary bezel display area. When the auxiliary bezel is placed in an operating position on a video display device the auxiliary bezel display area overlays a portion of the video display area with the first-side attachment structure extending along a first edge of the display device and the second-side attachment structure extending along a second edge of the display device. The first-side and second-side attachment features each comprise an arrangement by which the respective attachment structure is connectable to the video display device.

17 Claims, 6 Drawing Sheets

AUXILIARY BEZEL ASSEMBLY AND BEZEL ATTACHMENT METHOD FOR VIDEO DISPLAY DEVICES

TECHNICAL FIELD OF THE INVENTION

This disclosure relates to bezels that may be used for video display devices, particularly gaming machine video displays, to define a segregated graphic area of the display device.

BACKGROUND OF THE INVENTION

Electronic gaming machines such as those used in casinos and other gaming establishments are produced in numerous different configurations that implement a wide array of game features intended to increase player interest and enjoyment. In addition to mechanical display elements such as mechanical reels or wheels, modern gaming machines make wide use of various video display devices to display various aspects of game play. The video display devices of a gaming machine may be controlled to show video simulations of spinning elements such as reels or wheels, and numerous other types of game-play related graphics.

Gaming machines that include a mechanical prize wheel, for example, commonly house the mechanical prize wheel and a motor for spinning the wheel in a part of the gaming machine cabinet specifically configured to house the prize wheel with various trim structures and lighting elements located around the periphery of the prize wheel. This arrangement of surrounding trim and lighting elements may also be used for a video display device that is used to display a video simulation of a spinning prize wheel.

In view of the specially configured cabinet and surrounding trim pieces used for both mechanical prize wheels and video simulated prize wheels, a gaming machine configured for such a wheel feature can only be used for games that include such a feature. This limited use for a wheel-configured gaming machine has the effect in increasing inventory and production costs because differently configured gaming machines must be produced and stocked for games including a wheel feature and for games that do not include a wheel feature.

SUMMARY OF THE INVENTION

It is an object of the invention to provide an auxiliary bezel assembly that may be installed on a video display device of a gaming machine to define a bezel-segregated graphic area on the underlying video display device. Other objects of the invention include providing gaming machines configured with an auxiliary bezel assembly and providing methods for converting a gaming machine to provide a bezel-segregated graphic area.

An auxiliary bezel assembly according to one aspect of the present invention is adapted for use with a video display device that defines a video display area bordered by a first-side display edge structure and a second-side display edge structure. Such an auxiliary bezel assembly includes first-side and second-side attachment structures, an auxiliary bezel, and first-side and second-side attachment features. The auxiliary bezel defines an auxiliary bezel display area and is connected to the first-side attachment structure at a first side of the auxiliary bezel display area and to the second-side attachment structure at a second side of the auxiliary bezel display area. The first-side and second-side attachment structures are spaced apart across the auxiliary bezel display area so that when the auxiliary bezel is placed in an operating position on the video display device the auxiliary bezel display area overlays a portion of the video display area with the first-side attachment structure extending along a portion of the first-side display edge structure and the second-side attachment structure extending along a portion of the second-side display edge structure. The first-side and second-side attachment features each include an arrangement by which the respective attachment structure is connectable to the video display device when the auxiliary bezel in the operating position on the video display device.

An auxiliary bezel assembly according to this first aspect of the invention has the advantage that it may be installed on a gaming machine video display device to define a bezel-segregated graphic area within the display area of the video display device. The video display device may then be controlled to show desired graphics in the bezel-segregated graphic area. For example, a rectangular-shaped video display device may be modified with an auxiliary bezel assembly according the first aspect of the invention to define a circular display area within which the video display device may be controlled by the gaming machine to display a prize wheel that may be animated to spin as part of a game presentation at the gaming machine. Installing the auxiliary bezel assembly requires no change to the gaming machine cabinet and thus the gaming machine may be converted back to the full rectangular display area simply by removing the auxiliary bezel from the video display device.

A second aspect of the invention encompasses gaming machines on which an auxiliary bezel assembly according to the first aspect of the invention is installed.

In implementations according to the first or second aspects of the invention, the auxiliary bezel assembly may further include an auxiliary bezel back cover connected to the auxiliary bezel. The auxiliary bezel back cover may include a first-side cover extension forming part of the first-side attachment structure and a second-side cover extension forming part of the second-side attachment structure. Such an auxiliary bezel back cover may be formed in one piece with a cover center section adapted to mate with the auxiliary bezel in a back cover operating position in which an open area defined by the auxiliary bezel back cover aligns with the auxiliary bezel display area. The auxiliary bezel back cover in some implementations is formed from sheet metal with the first-side cover extension and second-side cover extension bent to extend transverse to a plane of the cover center section.

An auxiliary bezel assembly according to either of the first and second aspects of the invention my include a lighting assembly with one or more light emitting elements. In these implementations, a lighting control wiring assembly is operatively connected to the one or more light emitting elements and extends within the auxiliary bezel assembly from the lighting assembly and through a lighting control opening formed in either the first-side attachment structure or the second-side attachment structure. A light diffuser may be positioned on the auxiliary bezel to align with the lighting assembly. For example, such a light diffuser and lighting assembly may be used to implement a wheel pointer in a game to designate a selected wheel segment shown within the auxiliary bezel display area.

A third aspect of the invention encompasses methods for converting a gaming machine to define a bezel-segregated graphic area. Methods according to this third aspect include positioning an auxiliary bezel assembly on the video display device in an operating position in which an auxiliary bezel display area defined by the auxiliary bezel assembly overlays a portion of a display area defined by the video display device. Also in this operating position, a first-side attachment structure of the auxiliary bezel assembly extends along a portion of a first-side display edge structure of the video display device and a second-side attachment structure of the auxiliary bezel assembly extends along a portion of a second-side display edge structure of the video display device. The methods further include operatively connecting a driver end of a lighting control wiring assembly to an auxiliary bezel light driver circuit. The lighting control wiring assembly is routed from a lighting assembly of the auxiliary bezel assembly, through the auxiliary bezel assembly, and through a lighting control opening formed in either the first-side attachment structure and the second-side attachment structure. The methods then include securing the first-side attachment structure to the video display device through a first-side display edge structure of the video display device and securing the second-side attachment structure to the video display device through a second-side display edge structure of the video display device.

These and other aspects, advantages, and features of the invention will be apparent from the following description of representative embodiments, considered along with the accompanying drawings.

DESCRIPTION OF REPRESENTATIVE EMBODIMENTS

Figure 1:
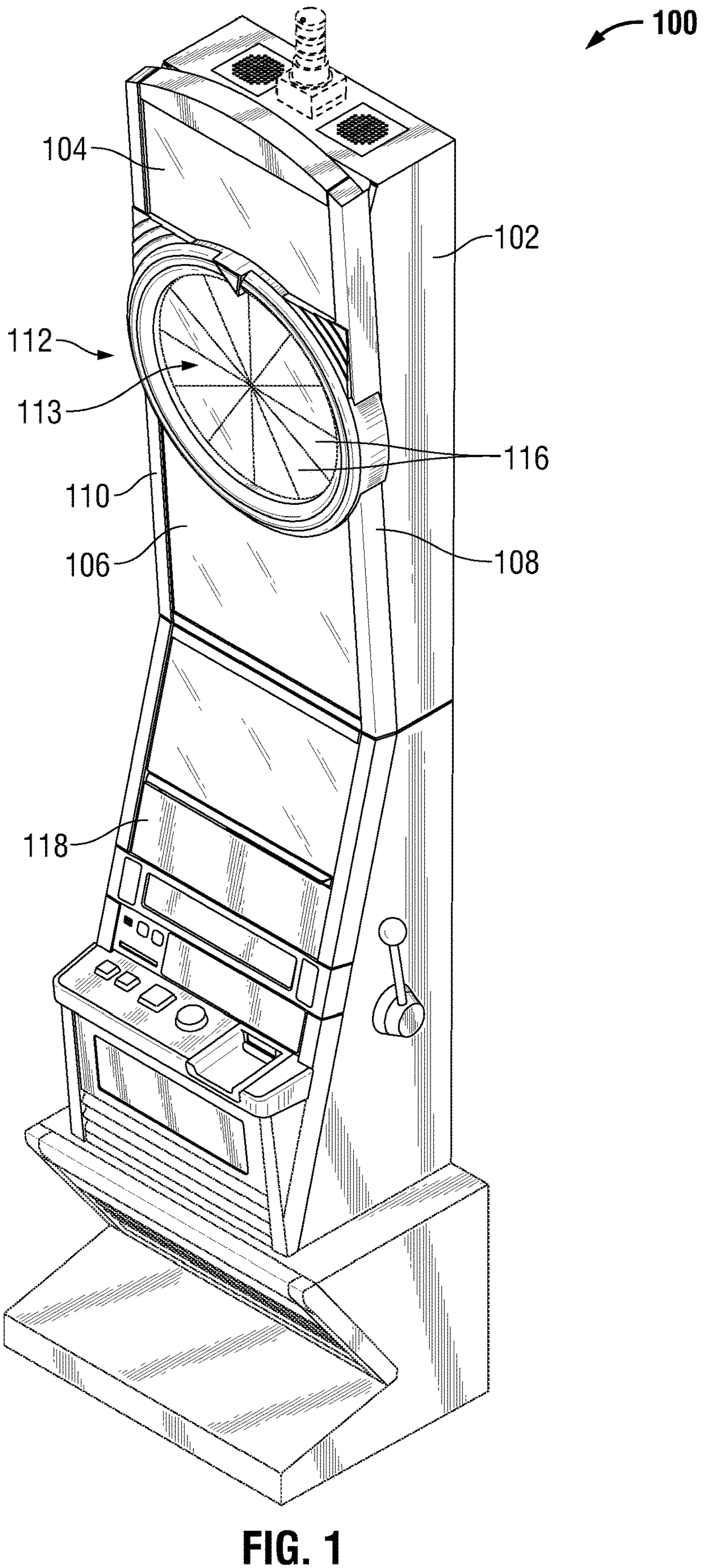
FIG. 1 is an isometric view of a gaming machine according to an aspect of the present invention.

Referring to FIG. 1, an example gaming machine 100 includes an upper display device cabinet 102 on which is mounted an upper display device 104 and a lower display device 106. These two display devices 104 and 106 together include a first-side display edge structure 108 and a second-side display edge structure 110. FIG. 1 also shows an auxiliary bezel assembly generally at 112 mounted in an operating position on lower display device 106. Auxiliary bezel assembly 112 defines and auxiliary bezel display area shown generally at 113. This display area comprises a segregated area of the display surface of lower display device 106. In the example of FIG. 1, this segregated display area 113 displays a wheel graphic including a number of separate wheel segments 116.

Figure 2:
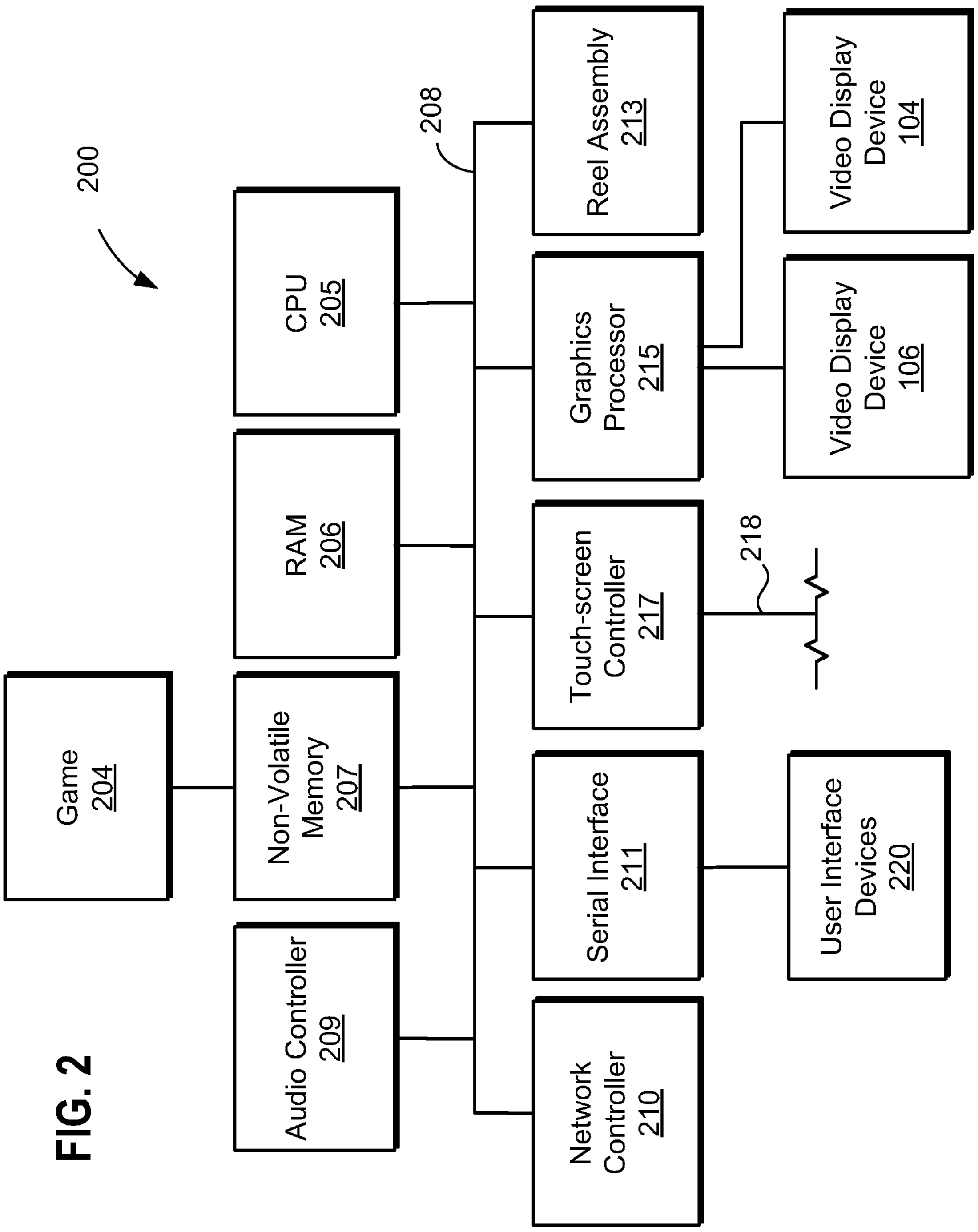
FIG. 2 is a schematic diagram showing the various components that may be included in the gaming machine shown in FIG. 1.

FIG. 2 shows a logical and hardware block diagram 200 of gaming machine 100 that includes a processor (CPU) 205 along with random access memory (RAM) 206 and non-volatile memory or storage device 207. All of these devices are connected on a system bus 208 with an audio controller device 209, a network controller 210, and a serial interface 211. A graphics processor 215 is also connected on bus 208 and is connected to drive at least video display devices 104 and 106. Graphic processor 215, or another graphics processor included in the gaming machine but not shown in this diagram, may also provide a suitable video output to video display devices included on the gaming machine such as video display devices 104 and 106 and a touch screen display device mounted on the button deck of gaming machine 100 for example. As shown in FIG. 2, gaming machine 100 also includes a touch screen controller 217 connected to system bus 208. Touch screen controller 217 is also connected via signal path 218 to receive signals from a touch screen element (not shown) associated with a video display device included on the lower portion of gaming machine 100.

Those familiar with data processing devices and systems will appreciate that other basic electronic components will be included in gaming machine 100 such as a power supply, cooling systems for the various system components, audio amplifiers, and other devices that are common in gaming machines. These additional devices are omitted from the drawings so as not to obscure the present invention in unnecessary detail.

All of the elements 205, 206, 207, 208, 209, 210, and 211 shown in FIG. 2 are elements commonly associated with a personal computer, although they may be specially designed and configured for use in a gaming environment. These elements may be mounted on one or more circuit boards housed within cabinet 101 with or without a separate enclosure. Those familiar with data processing systems and the various data processing elements shown in FIG. 2 will appreciate that many variations on this illustrated structure may be used within the scope of the present invention. For example, since serial communications are commonly employed to communicate with a touch screen controller such as touch screen controller 217, the touch screen controller may not be connected on system bus 208, but instead include a serial communications line to serial interface 211 (a USB controller for example). It will also be appreciated that some of the devices shown in FIG. 2 as being connected directly on system bus 208 may in fact communicate with the other system components through a suitable expansion bus. Audio controller 209, for example, may be connected to the system via a PCI or PCIe bus or bus configured according to some other expansion bus standard. System bus 208 is shown in FIG. 2 merely to indicate that the various components are connected in some fashion for communication with CPU 205 and is not intended to limit the invention to any particular bus architecture.

Numerous other variations in the gaming machine internal structure and system may be used without departing from the principles of the present invention. For example, a gaming machine in some embodiments of the present invention may rely on one or more data processors located remotely from the gaming machine itself. Embodiments of the present invention may include no processor such as CPU 205 or graphics processor such as 215 at the gaming machine, and may instead rely on one or more remote processors. Thus unless specifically stated otherwise, the designation "gaming machine" is used in this disclosure and the accompanying claims to designate a system of devices that operate together to provide the indicated functions. A "gaming machine" may include a gaming machine such as gaming machine 100 shown in FIGS. 1 and 2, that is itself a system of various components, and may also include one or more components remote from a gaming machine cabinet (that is, the cabinets of gaming machine 100 in FIG. 1). As used herein, the designation "gaming machine" encompasses both a stand-alone gaming machine and a gaming machine along with one or more remote components for providing various functions (such as identifying prizes for a given play and controlling result display graphics and performing other operations).

It will also be appreciated that graphics processors are also commonly a part of modern computer systems. Although separate graphics processor 215 is shown for controlling primary video display device 104, CPU 205 or a graphics processor packaged with or included with CPU 205 may control all of the display devices directly without any separately packaged graphics processor. The invention is not limited to any particular arrangement of processing devices for controlling the video display devices included with gaming machine 100. Also, a gaming machine implementing the present invention is not limited to any particular number of video display devices or other types of display devices. While display devices 104 and 106 are shown in the example implementation, the display device area may be arranged differently than the portrait orientation shown or may be an area of a single display device.

In the illustrated gaming machine 100, CPU 205 executes software, that is, program code, that ultimately controls the entire gaming machine including the receipt of player inputs and the presentation of the graphics or information displayed according to the invention through the display devices 104 and 106 and other display devices associated with the gaming machine. CPU 205 also executes software related to communications handled through network controller 210, and software related to various peripheral devices such as those connected to the system through audio controller 209, serial interface 211, and touch screen controller 217. CPU 205 may also execute software to perform accounting functions associated with game play. Random access memory 206 provides memory for use by CPU 205 in executing its various software programs while the nonvolatile memory or storage device 207 may comprise mass storage device providing storage for game software (program code) prior to loading into random access memory 206 for execution, or for programs and program assets not in use or for other data generated or used in the course of gaming machine operation. Network controller 210 provides an interface to other components of a gaming system in which gaming machine 100 may be included.

It should be noted that the invention is not limited to gaming machines employing the personal computer-type arrangement of processing devices and interfaces shown in example gaming machine 100. Other gaming machines through which the invention may be implemented may include one or more special purpose processing devices to perform the various processing steps for implementing the invention. Unlike general purpose processing devices such as CPU 205, that may comprise an Intel® or AMD® processor for example, these special purpose processing devices may not employ operational program code to direct the various processing steps.

Reel Assembly 213 is shown in the diagrammatic representation of FIG. 2 to illustrate that a gaming machine with which an auxiliary bezel assembly may be used may also include mechanical reels. In the example of gaming machine 100 in FIG. 1, a number of mechanical reels may be provided in an area of the gaming machine lower cabinet behind a glass area 118. Although the invention is not limited to any particular mechanical reel arrangement or control system, mechanical reels may be controlled conveniently through serial communications to a reel controller that provides instructions for a respective stepper motor for each reel. Thus some embodiments of the present invention that employ mechanical reels may use a serial interface device such as serial interface 211 to control communications with the reel assembly, and may not include a direct bus interconnection as indicated by FIG. 2.

Figure 3:
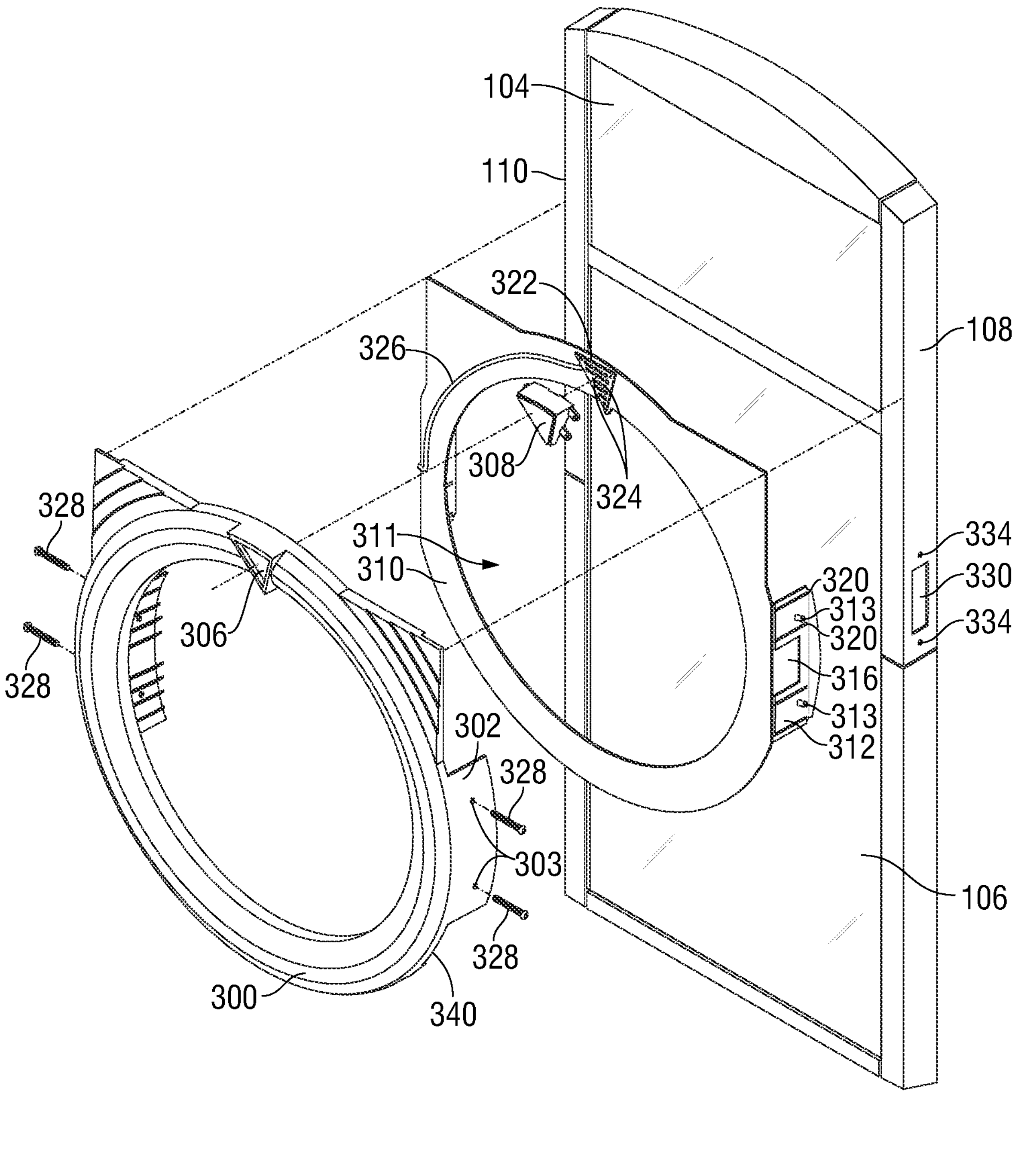
FIG. 3 is a partially exploded view from a first perspective showing the auxiliary bezel assembly included with the gaming machine shown in FIG. 1.
Figure 4:
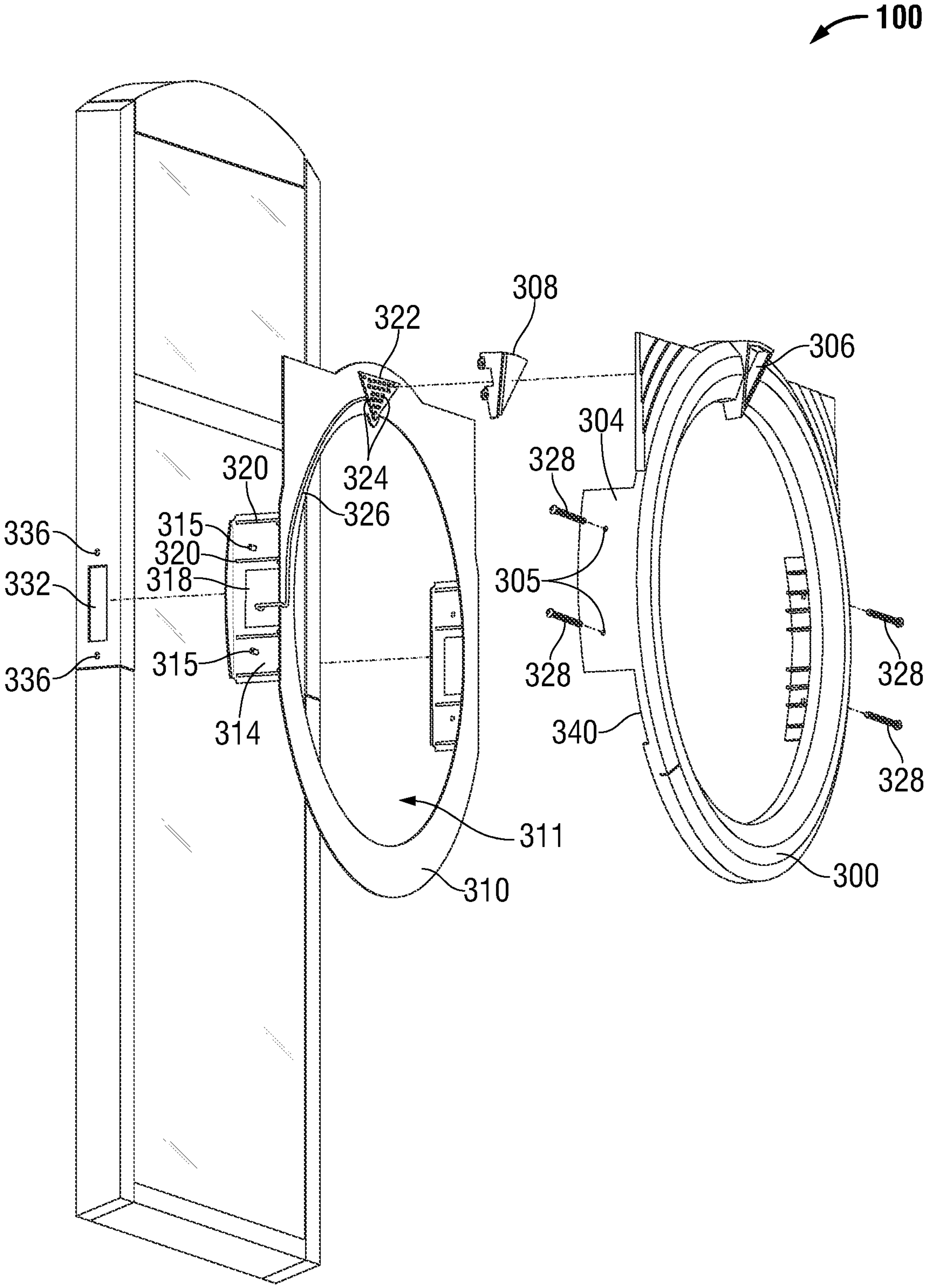
FIG. 4 is a partially exploded view from a second perspective showing the auxiliary bezel assembly included with the gaming machine shown in FIG. 1.

Referring now to FIGS. 3 and 4, the auxiliary bezel assembly 112 shown in FIG. 1 includes an auxiliary bezel 300 defining in this example a circular opening corresponding to the display area 113 shown in FIG. 1. Auxiliary bezel 300 includes a first-side auxiliary bezel extension 302 (shown in FIG. 3) having two bezel fastener openings 303 and a second-side auxiliary bezel extension 304 (shown in FIG. 4) having bezel fastener openings 305. The example auxiliary bezel 300 also includes a light diffuser opening 306 which is adapted to receive a light diffuser 308.

The example auxiliary bezel assembly 112 also includes an auxiliary bezel back cover 310 having a first-side cover extension 312 and first-side fastener sleeves 313. As shown in the perspective of FIG. 4, auxiliary bezel back cover 310 also includes a second-side cover extension 314 on which is mounted second-side fastener sleeves 315. The first-side cover extension 312 and second-side cover extension 314 are located in a spaced apart arrangement on opposite sides of a cover center section which defines an open area 311. Each of the two cover extensions 312 and 314 in this example include a respective wire routing opening. First-side wire routing opening 316 is shown in first-side cover extension while second-side wire routing opening 318 is shown in second-side cover extension 314. Each of the cover extensions 312 and 314 also include a series of slots 320. The function of these slots 320 will be described below in connection with FIG. 5.

FIGS. 3 and 4 also show that the example auxiliary bezel assembly 112 includes a bezel lighting printed circuit board 322 containing a number of individually controllable LED lights 324. A lighting wiring assembly 326 is operatively connected at one end to the lighting printed circuit board 322 with and opposite end extending to the second-side cover extension 314 in position to be routed through second-side wire routing opening 318.

The exploded view of FIG. 3 shows bezel assembly fasteners 328 that are adapted to attach bezel assembly 112 to the lower display device 106 at the first side of the display device. As shown in the perspective of FIG. 4, bezel assembly fasteners 328 are also used to attach bezel assembly 112 to the lower display device 106 at the opposite second side of the display device.

The exploded view of FIGS. 3 and 4 also show that the display device edge structures 106 and 108 each include wire routing openings. FIG. 3 shows first-side display device edge opening 330 while FIG. 4 shows second-side display device edge opening 332. Each of these display device structure openings is associated with a pair of faster openings in this example including first-side fastener openings 334 and second-side fastener openings 336.

Figure 5:
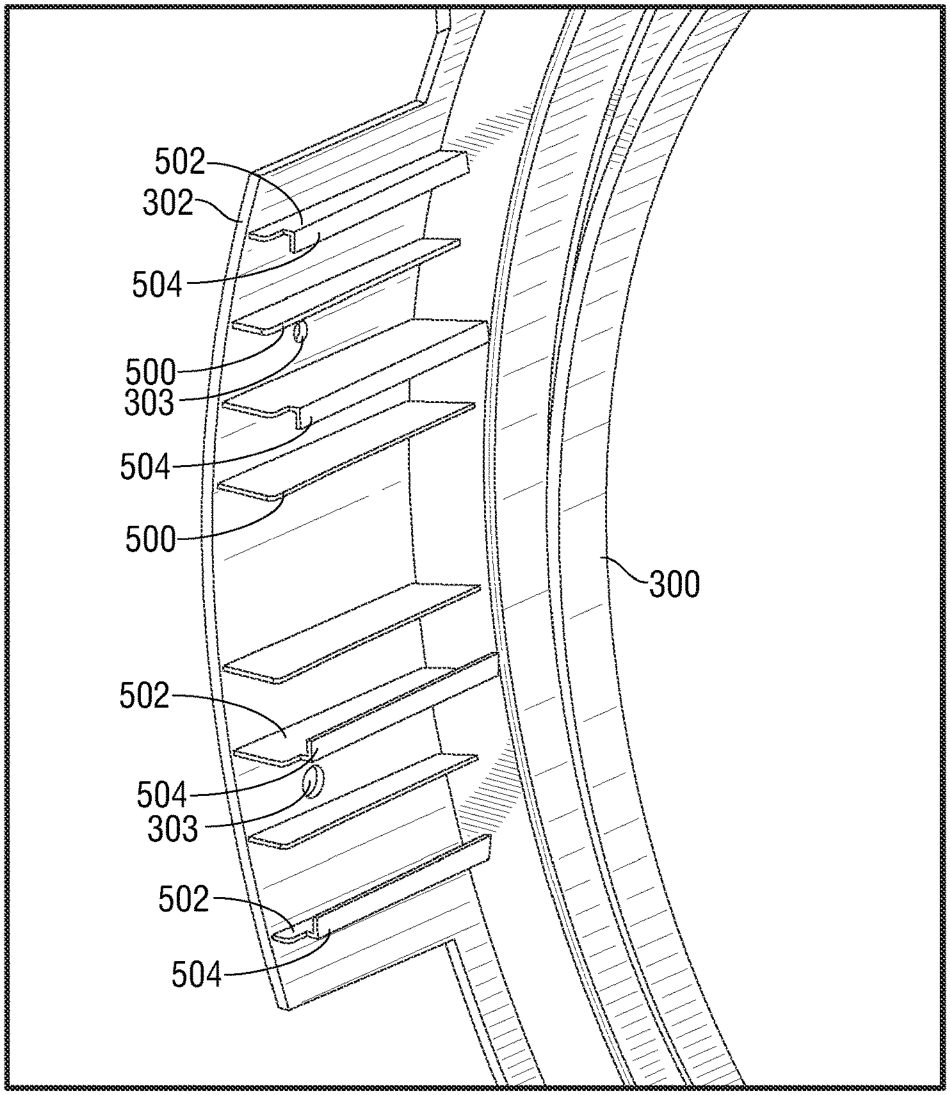
FIG. 5 is an enlarged isometric view of the second-side auxiliary bezel extension shown in FIG. 4.

Referring now to FIG. 5, the enlarged view of the inside surface of first-side auxiliary bezel extension 302 includes a number of support ribs 500 and a number of interlocking support ribs 502. Each interlocking support ribs includes a locking end 504. The support ribs are adapted to cooperate with the cover extension 312 when the auxiliary bezel 300 is in a connected position with the auxiliary bezel back cover 310. In particular, each locking end 504 is adapted to be received in a slot 320 and each support rib 500 is adapted to abut a surface of first-side cover extension 312 when auxiliary bezel 300 and back cover 310 are placed in the connected position with each other. Corresponding cooperation occurs on the other side of the bezel assembly between second-side auxiliary bezel extension 304 and second-side cover extension 314.

Example auxiliary bezel 300 and auxiliary bezel back cover 310 are adapted to be assembled together in the connected position to form the bezel assembly 112 in FIG. 1 prior to securing the bezel assembly to display device 106. Any suitable arrangement may be used to place auxiliary bezel 300 and back cover 310 in the connected position. For example, auxiliary bezel back cover 310 may be configured with fastener openings at various points in the cover center part and auxiliary bezel 300 may be configured with fastener receivers on a side facing the cover in FIGS. 3 and 4. In these implementations threaded fasteners may be placed through the fastener openings in the auxiliary bezel back cover 310 and threaded into the fastener receivers formed on the auxiliary bezel 300. These connection details for connecting bezel 300 and cover 310 are omitted from the figures.

Figure 6:
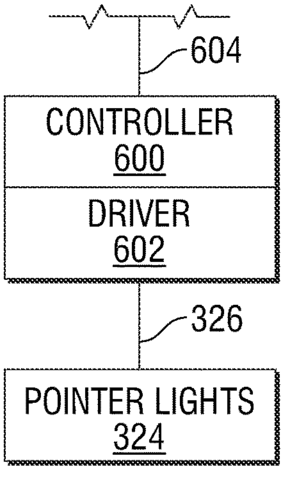
FIG. 6 is a schematic diagram shown an example control arrangement that may be used with some embodiments of an auxiliary bezel assembly according to aspects of the present invention.

FIG. 6 shows a control arrangement that may be used to control the LED lights 324 included on lighting printed circuit board 322 in the example shown in FIGS. 3 and 4. The control arrangement includes an LED controller 600 operatively connected to an LED driver circuit 602. LED controller 600 includes a suitable microprocessor that is connected to receive instructions from a gaming machine processor such as processor 215 shown in FIG. 2. Communications between the gaming machine processor and LED controller 600 may be serial communications and thus the line 604 shown in FIG. 6 from the LED controller may comprise a suitable serial communications cable. This serial communications cable may extend to a serial controller such as controller 211 in FIG. 2 to facilitate communications between the gaming machine processor and LED controller 600. Under the control of LED controller 600, LED driver circuit produces suitable LED driving signals that are communicated via wiring assembly 326 to the LEDs 324. The LED controller 600 and LED driver circuit may be located in the gaming machine at any suitable location such as a location near the gaming machine processor (215 in FIG. 2) and other control components.

Figure 7:
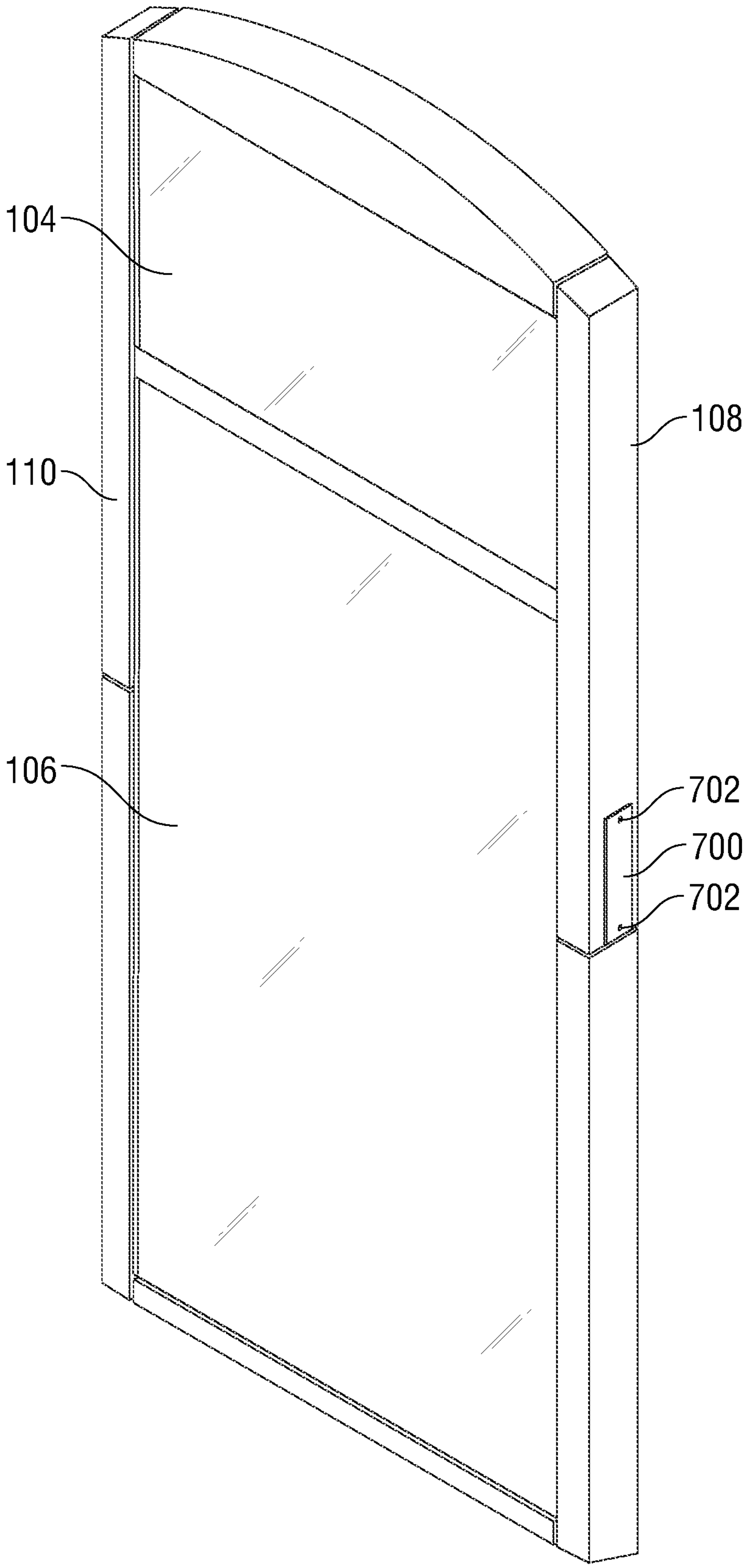
FIG. 7 is an isometric view of the upper display devices of the gaming machine shown in FIG. 1, but as configured without the auxiliary bezel assembly.

FIG. 7 shows the condition of the upper and lower display devices, 104 and 106, respectively, when auxiliary bezel assembly 112 is removed from the operating position shown in FIG. 1. As indicated by the exploded views of FIGS. 3 and 4, removing the auxiliary bezel assembly 112 leaves the first-side edge structure opening 330 exposed together with the first-side fastener openings 334. It will be appreciated that second-side edge structure opening 332 and second-side fastener openings 336 are also exposed by removing auxiliary bezel assembly 112. A gaming machine configured to accept auxiliary bezel assembly 112 shown in FIG. 1 may thus include a cover plate 700 for each of the openings 330 and 332. Suitable fasteners may be used to connect the respective cover plate 700 over the respective opening 330 or 332 using the same fastener openings 334 or 336 used to connect auxiliary bezel assembly 112 in the operating position. Since the particular example gaming machine 100 shown in the figures includes two separate display devices 104 and 106 mounted on the display device cabinet 102, an additional trim piece (not shown in the figures) may be connected over the gap or seam between display devices 104 and 106 when auxiliary bezel assembly 112 is removed from the operating position shown in FIG. 1.

The method of attaching example auxiliary bezel assembly 112 to gaming machine 100 may now be described with reference particularly to FIGS. 1, 3, and 4. With the display devices 104 and 106 in the condition indicated in the exploded views of FIGS. 3 and 4, and with auxiliary bezel 300, auxiliary bezel back cover 310, light diffuser 308, printed circuit board 322, and wire assembly 326 assembled to produce the auxiliary bezel assembly 112 in this example, the connected first-side cover extension 312 and first-side auxiliary bezel extension 302 forms a first-side attachment structure while the second-side cover extension 314 and second-side auxiliary bezel extension 304 forms a second-side attachment structure. The auxiliary bezel assembly 112 is first positioned with the first-side attachment structure extending along a portion of the first-side display device edge aligned with opening 330 and with the second-side attachment structure extending along a portion of the second-side display device edge aligned with second-side opening 332 shown in FIG. 4. Bezel assembly fasteners 328 may then be inserted through the aligned bezel faster openings 303, fastener sleeves 313, and fastener openings 330 in the first-side display device bezel 108 to secure the first side of bezel assembly. Similarly, bezel assembly fasteners 328 may be extended through the aligned second-side fastener openings 305, sleeves 315, openings 336 of the second-side display device bezel 110 to secure the second side of bezel assembly 112 to display device 106.

In implementations such as that shown in the example where lights and or potentially other electronic devices are included in the auxiliary bezel assembly, the wiring (such as wiring assembly 326) for those electronic components may be routed through the bezel assembly in the area between auxiliary bezel 300 and back cover 310 to one side of the bezel assembly where the wire may be routed further through wire routing opening 316 or 318 and then 330 or 332 to reach the interior of cabinet 102 (shown in FIG. 1).

Numerous variations are possible relative to example auxiliary bezel assembly 112 shown in the figures. In some implementations, the auxiliary bezel such as bezel 300 may be sufficiently rigid without a cover such as back cover 310 that extends the entire width of the assembly. In these cases the auxiliary bezel assembly may include no back cover. Of course the display area defined by an auxiliary bezel assembly within the scope of the invention need not be a circular area. The auxiliary bezel assembly may be configured to segregate an area of any shape on an underlying display device. These and other variations are possible within the scope of the invention.

Variations are also possible in a gaming machine with which the auxiliary bezel assembly may be used. In particular, an auxiliary bezel assembly according to the present invention is not limited to use with a display device arrangement such as that shown in the figures. Although the example gaming machine includes bezels at the first and second sides of the display devices 104 and 106, an auxiliary bezel assembly in accordance with the present invention is compatible with other display device structures. For example, a display device may be housed in an assembly with no bezel per se, that is, with no trim piece that covers a peripheral front surface of the display device. In these cases, an auxiliary bezel assembly according to the present invention may attach to a side housing for the display device. Furthermore, the attachment features of a bezel assembly within the scope of the present invention may comprises clamping structures that clamp on to a display device.

Where an auxiliary bezel is adapted to used with a gaming display device that includes an edge bezel of some thickness covering the edge of the display device, the auxiliary bezel may be configured to accommodate the thickness of that edge bezel while still lying essentially flush against the outer front surface of the display area of the display device. The example gaming machine 100 in FIG. 1 shows such bezels (making up display device edge structures 108 and 110). Auxiliary bezel 300 therefore includes cutouts 340 below each extension 302 and 304.

As used herein, whether in the above description or the following claims, the terms "comprising," "including," "carrying," "having," "containing," "involving," and the like are to be understood to be open-ended, that is, to mean including but not limited to. Also, it should be understood that the terms "about," "substantially," and like terms used herein when referring to a dimension or characteristic of a component indicate that the described dimension/characteristic is not a strict boundary or parameter and does not exclude variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Any use of ordinal terms such as "first," "second," "third," etc., in the following claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

The term "each" may be used in the following claims for convenience in describing characteristics or features of multiple elements, and any such use of the term "each" is in the inclusive sense unless specifically stated otherwise. For example, if a claim defines two or more elements as "each" having a characteristic or feature, the use of the term "each" is not intended to exclude from the claim scope a situation having a third one of the elements which does not have the defined characteristic or feature.

The above-described representative embodiments are intended to illustrate the principles of the invention, but not to limit the scope of the invention. Various other embodiments and modifications to these preferred embodiments may be made by those skilled in the art without departing from the scope of the present invention. For example, in some instances, one or more features disclosed in connection with one embodiment can be used alone or in combination with one or more features of one or more other embodiments. More generally, the various features described herein may be used in any working combination.

The invention claimed is:

1. An auxiliary bezel assembly for a video display device defining a video display area bordered by a first-side display edge and a second-side display edge, the auxiliary bezel assembly including:

(a) a first-side attachment structure;

(b) a second-side attachment structure;

(c) an auxiliary bezel defining an auxiliary bezel display area, the auxiliary bezel being connected to the first-side attachment structure at a first side of the auxiliary bezel display area and being connected to the second-side attachment structure at a second side of the auxiliary bezel display area spaced apart from the first-side attachment structure across the auxiliary bezel display area so that when the auxiliary bezel is placed in an operating position on the video display device the auxiliary bezel display area overlays a portion of the video display area with the first-side attachment structure extending along a portion of the first-side display edge and the second-side attachment structure extending along a portion of the second-side display edge;

(d) a first-side attachment feature by which the first-side attachment structure is connectable to the video display device when the auxiliary bezel in the operating position on the video display device;

(e) a second-side attachment feature by which the second-side attachment structure in connectable to the video display device when the auxiliary bezel in the operating position on the video display device;

(f) a lighting assembly connected to the auxiliary bezel and including one or more light emitting elements; and (g) a lighting control wiring assembly operatively connected to the one or more light emitting elements and extending within the auxiliary bezel assembly from the lighting assembly and through a wire routing opening formed in one of the first-side attachment structure and the second-side attachment structure.

2. The auxiliary bezel assembly of claim 1 further including an auxiliary bezel back cover connected to the auxiliary bezel, the auxiliary bezel back cover including (i) a first-side cover extension forming part of the first-side attachment structure and including (ii) a second-side cover extension forming part of the second-side attachment structure.

3. The auxiliary bezel assembly of claim 2 wherein the auxiliary bezel back cover is formed in one piece with a cover center section adapted to mate with the auxiliary bezel in a back cover operating position in which an open area defined by the auxiliary bezel back cover aligns with the auxiliary bezel display area.

4. The auxiliary bezel assembly of claim 3 wherein the auxiliary bezel back cover is formed from sheet metal with the first-side cover extension and second-side cover extension extending transverse to a plane of the cover center section.

5. The auxiliary bezel assembly of claim 3 wherein the auxiliary bezel display area is circular in shape in a plane of the auxiliary bezel.

6. The auxiliary bezel assembly of claim 3 wherein:

(a) the first-side attachment feature includes one or more first-side fastener passages, each first-side fastener passage including an opening through the first-side cover extension and a first-side auxiliary bezel extension of the auxiliary bezel; and (b) the second-side attachment feature includes one or more second-side fastener passages, each second-side fastener passage including an opening through the second-side cover extension and a second-side auxiliary bezel extension of the auxiliary bezel.

7. The auxiliary bezel assembly of claim 1 wherein the auxiliary bezel includes a light diffuser positioned to align with the lighting assembly.

8. A gaming machine including:

(a) a video display device defining a video display area bordered by a first-side display edge and a second-side display edge;

(b) a first-side attachment structure of an auxiliary bezel assembly;

(b) a second-side attachment structure of the auxiliary bezel assembly;

(c) an auxiliary bezel of the auxiliary bezel assembly connected in an operating position on the video display device, the auxiliary bezel defining an auxiliary bezel display area, being connected to the first-side attachment structure at a first-side of the auxiliary bezel display area, and being connected to the second-side attachment structure at a second side of the auxiliary bezel display area spaced apart from the first-side attachment structure across the auxiliary bezel display area so that the auxiliary bezel display area overlays a portion of the video display area with the first-side attachment structure extending along a portion of the first-side display edge and the second-side attachment structure extending along a portion of the second-side display edge;

(d) a first-side attachment feature of the auxiliary bezel assembly by which the first-side attachment structure is connected to the video display device;

(e) a second-side attachment feature of the auxiliary bezel assembly by which the second-side attachment structure in connected to the video display device;

(f) wherein the auxiliary bezel assembly further includes (i) a lighting assembly connected to the auxiliary bezel and including one or more light emitting elements, and (ii) a lighting control wiring assembly operatively connected to the one or more light emitting elements and extending within the auxiliary bezel assembly from the lighting assembly and through a wire routing opening formed in one of the first-side attachment structure and the second-side attachment structure; and (g) further comprising an auxiliary bezel light driver circuit operatively connected to the lighting control wiring assembly and an auxiliary bezel lighting controller operatively connected to the auxiliary bezel light driver circuit, the auxiliary bezel lighting controller being operatively connected to receive signals from a processor of the gaming machine.

9. The gaming machine of claim 8 wherein the auxiliary bezel assembly further includes an auxiliary bezel back cover connected to the auxiliary bezel, the auxiliary bezel back cover including (i) a first-side cover extension forming part of the first-side attachment structure and including (ii) a second-side cover extension forming part of the second-side attachment structure.

10. The gaming machine of claim 9 wherein the auxiliary bezel back cover is formed in one piece with a cover center section that mates with the auxiliary bezel in a back cover operating position in which an open area defined by the auxiliary bezel back cover aligns with the auxiliary bezel display area.

11. The gaming machine of claim 10 wherein the auxiliary bezel back cover is formed from sheet metal with the first-side cover extension and second-side cover extension extending transverse to a plane of the cover center section.

12. The gaming machine of claim 10 wherein the auxiliary bezel display area is circular in shape in a plane of the auxiliary bezel.

13. The gaming machine of claim 10 wherein:

(a) the first-side attachment feature includes one or more first-side fastener passages, each first-side fastener passage including an opening through the first-side cover extension and a first-side auxiliary bezel extension of the auxiliary bezel; and (b) the second-side attachment feature includes one or more second-side fastener passages, each second-side fastener passage including an opening through the second-side cover extension and a second-side auxiliary bezel extension of the auxiliary bezel.

14. The gaming machine of claim 8 wherein the auxiliary bezel includes a light diffuser positioned to align with the lighting assembly.

15. A method of converting a gaming machine to define a bezel-segregated graphic area, the method including:

(a) positioning an auxiliary bezel assembly on a video display device of the gaming machine in an operating position in which an auxiliary bezel display area defined by an auxiliary bezel of the auxiliary bezel assembly overlays a portion of a display area defined by the video display device and in which a first-side attachment structure of the auxiliary bezel assembly extends along a portion of a first-side structure of the video display device and a second-side attachment structure of the auxiliary bezel assembly extends along a portion of a second-side structure of the video display device;

(b) operatively connecting a driver end of a lighting control wiring assembly to an auxiliary bezel light driver circuit, the lighting control wiring assembly being routed from a lighting assembly of the auxiliary bezel assembly, through the auxiliary bezel assembly, and through a wire routing opening formed in one of the first-side attachment structure and the second-side attachment structure;

(c) securing the first-side attachment structure to the video display device through a first-side structure of the video display device; and (d) securing the second-side attachment structure to the video display device through a second-side structure of the video display device.

16. The method of claim 15 further including:

(a) prior to positioning the auxiliary bezel assembly on the video display device in the operating position exposing a display device bezel opening by removing at least one of a first-side cover plate from the first-side structure of the video display device and a second-side cover plate from the second-side structure of the video display device; and (b) routing the lighting control wiring assembly through the exposed display bezel opening.

17. The method of claim 15 wherein:

(a) securing the first-side attachment structure to the video display device through the first-side structure of the video display device includes placing one or more fasteners through the first-side attachment structure and the first-side structure of the video display device; and (a) securing the second-side attachment structure to the video display device through the second-side structure of the video display device includes placing one or more fasteners through the second-side attachment structure and the second-side structure of the video display device.

* * * * *